(12) United States Patent
Kim et al.

(10) Patent No.: US 8,173,091 B2
(45) Date of Patent: May 8, 2012

(54) METHOD FOR PREPARING NANOPHOSPHOR FROM METAL HYDROXY CARBONATE AND NANOPHOSPHOR PREPARED BY THE METHOD

(75) Inventors: Young Sic Kim, Seoul (KR); Seoung Jae Im, Seoul (KR); Kubota Shunichi, Seongnam-si (KR); Jae Ho Lee, Yongin-si (KR); Tae Gon Kim, Seoul (KR); Seok Hyun Nam, Seoul (KR); Dong Chin Lee, Cheonan-si (KR)

(73) Assignees: Samsung Electronics Co., Ltd. (KR); Samsung Corning Precision Glass Co., Ltd. (KR)

( * ) Notice: Subject to any disclaimer, the term of this patent is extended or adjusted under 35 U.S.C. 154(b) by 804 days.

(21) Appl. No.: 12/113,267

(22) Filed: May 1, 2008

(65) Prior Publication Data

US 2009/0075082 A1  Mar. 19, 2009

(30) Foreign Application Priority Data

Sep. 18, 2007  (KR) ..................... 10-2007-0094847

(51) Int. Cl.
  *B32B 5/16*   (2006.01)
  *C01F 17/00*  (2006.01)
  *C09K 11/77*  (2006.01)
(52) U.S. Cl. ................. 423/263; 252/301.4 R
(58) Field of Classification Search ............... 428/402; 252/301.4 R
See application file for complete search history.

(56) References Cited

U.S. PATENT DOCUMENTS

| | | | | |
|---|---|---|---|---|
| 3,637,517 A * | 1/1972 | Mathers et al. | ......... | 252/301.4 R |
| 3,668,142 A * | 6/1972 | Luckey | ..................... | 252/301.5 |
| 4,497,785 A * | 2/1985 | Tilley et al. | ................... | 423/263 |
| 5,352,426 A * | 10/1994 | Kimura et al. | ............... | 423/263 |
| 6,132,642 A * | 10/2000 | Kane | ..................... | 252/301.4 S |
| 6,238,593 B1 * | 5/2001 | Huguenin et al. | ...... | 252/301.4 R |
| 6,284,155 B1 * | 9/2001 | Rao | ........................ | 252/301.4 R |
| 6,299,797 B1 | 10/2001 | Igarashi et al. | | |
| 6,506,320 B2 * | 1/2003 | Kobayashi et al. | .... | 252/301.4 R |
| 6,596,196 B2 * | 7/2003 | Huguenin et al. | ...... | 252/301.4 R |
| 6,660,185 B2 * | 12/2003 | Hampden-Smith et al. | ..................... | 252/301.4 R |
| 6,706,210 B1 * | 3/2004 | Dobson et al. | ........ | 252/301.4 R |
| 7,118,687 B2 * | 10/2006 | Ito et al. | ................. | 252/301.4 F |
| 7,378,038 B2 * | 5/2008 | Hubacek et al. | ........ | 252/301.4 S |
| 7,481,951 B2 * | 1/2009 | Jermann et al. | ........ | 252/301.4 R |
| 2005/0029495 A1 | 2/2005 | Hubacek et al. | | |
| 2009/0050848 A1 * | 2/2009 | Kim et al. | .............. | 252/301.4 R |

FOREIGN PATENT DOCUMENTS

| | | |
|---|---|---|
| KR | 10-2000-0077178 | 12/2000 |
| KR | 10-2002-0022456 | 3/2002 |
| KR | 1020020022456 | 3/2002 |
| KR | 1020000077178 A | 12/2002 |
| KR | 10-2004-0033407 | 4/2004 |
| KR | 1020040033407 A | 4/2004 |
| WO | WO 97/23612 | * 7/1997 |

* cited by examiner

*Primary Examiner* — Hoa (Holly) Le
(74) *Attorney, Agent, or Firm* — Cantor Colburn LLP

(57) ABSTRACT

Disclosed herein is a method for preparing a nanophosphor from a metal hydroxy carbonate and a nanophosphor prepared by the method. The method is capable of mass-production of a uniform particle-size nanophosphor with superior dispersibility and enables reduction in preparation costs. The nanophosphor prepared by the disclosed method exhibits high luminescence efficiency.

11 Claims, 4 Drawing Sheets

METHOD FOR PREPARING NANOPHOSPHOR FROM METAL HYDROXY CARBONATE AND NANOPHOSPHOR PREPARED BY THE METHOD

This application claims priority to Korean Patent Application No. 10-2007-94847, filed on Sep. 18, 2007, and all the benefits accruing therefrom under 35 U.S.C. §119, the contents of which in its entirety are herein incorporated by reference.

BACKGROUND

This disclosure relates to a nanophosphor and a method for preparing a nanophosphor from metal hydroxy carbonate. The method is useful for the mass-production of a uniform particle-size nanophosphor with superior dispersibility and high-efficiency.

Luminescence is defined as a phenomenon in which a material absorbs external energy to emit visible light. In a broad sense, a material exhibiting this phenomenon is called a "phosphor".

Reduction in the particle size of a nanophosphor results in variation in the energy level of emission and a reduction in afterglow time, thus causing a shift in the energy of peaks in photoluminescence spectra to a shorter wavelength.

Commercially available methods for preparing nanophosphors include spray pyrolysis, wet methods and solid phase methods. The spray pyrolysis method has advantages in that the uniformity and size of nanophosphor particles produced by spray pyrolysis are more readily controlled. However, this method has disadvantages in the occurrence of defects (e.g., pores) in the final phosphor particles that make it difficult to further improve the luminescence efficiency of phosphors prepared by spray pyrolysis. In addition, the method is impractical for mass-production due to high preparation costs.

Other approaches have been considered for the preparation of nanophosphors. However, commercially available methods have problems associated with particle dispersibility, particle size distribution, color purity and luminescence efficiency.

SUMMARY

Disclosed herein is a method for preparing a nanophosphor with good dispersibility, uniform particle size distribution, superior color purity and excellent luminescence efficiency. The method is capable of reducing preparation costs by use of a simplified process.

Disclosed herein too is a nanophosphor prepared by the method.

Disclosed herein too is a display device employing the nanophosphor.

In one embodiment, there is provided a method for preparing a nanophosphor using an activator-doped metal hydroxy carbonate as a phosphor precursor.

In another embodiment, there is provided a method for preparing a nanophosphor comprising dissolving a metal precursor, an activator and urea ($NH_2CONH_2$) in a solvent to prepare a solution; adjusting a pH of the solution to a selected pH such that the metal in the solution exists in an ionic state, and controlling a reaction temperature to prepare a phosphor precursor; and calcining the phosphor precursor to obtain a nanophosphor.

In yet another embodiment, there is provided a method for preparing a nanophosphor comprising dissolving a metal precursor and urea ($NH_2CONH_2$) in a solvent to prepare a solution; adjusting a pH of the solution to a selected pH such that the metal in the solution exists in an ionic state, and controlling a reaction temperature to prepare a metal hydroxy carbonate containing solution; adding an activator to the metal hydroxy carbonate-containing solution to prepare a phosphor precursor; and calcining the phosphor precursor to obtain a nanophosphor.

In yet another embodiment, there is provided a display device comprising the nanophosphor.

Also disclosed is a nanophosphor prepared by the either of the above methods.

BRIEF DESCRIPTION OF THE FIGURES

Exemplary embodiments will be more clearly understood from the following detailed description taken in conjunction with the accompanying drawings.

FIG. 1 is a graph showing the state of yttrium hydroxide at 25° C.;

FIG. 2 is a scanning electron micrograph (SEM) of yttrium hydroxy carbonate nanoparticles;

FIG. 3 is a scanning electron micrograph (SEM) of europium-doped yttrium hydroxy carbonate nanoparticles prepared in Example 1;

FIG. 4 is a scanning electron micrograph (SEM) of a nanophosphor prepared in Example 1;

FIG. 5 is a scanning electron micrograph (SEM) of a nanophosphor prepared in Example 2;

FIG. 6 is a scanning electron micrograph (SEM) of a nanophosphor prepared in Example 3;

FIG. 7 is a scanning electron micrograph (SEM) of a nanophosphor prepared in Example 4; and FIG. 8 is a graph showing photoluminescence spectra of nanophosphors prepared in the Examples and Comparative Example.

DETAILED DESCRIPTION

Figure 1:
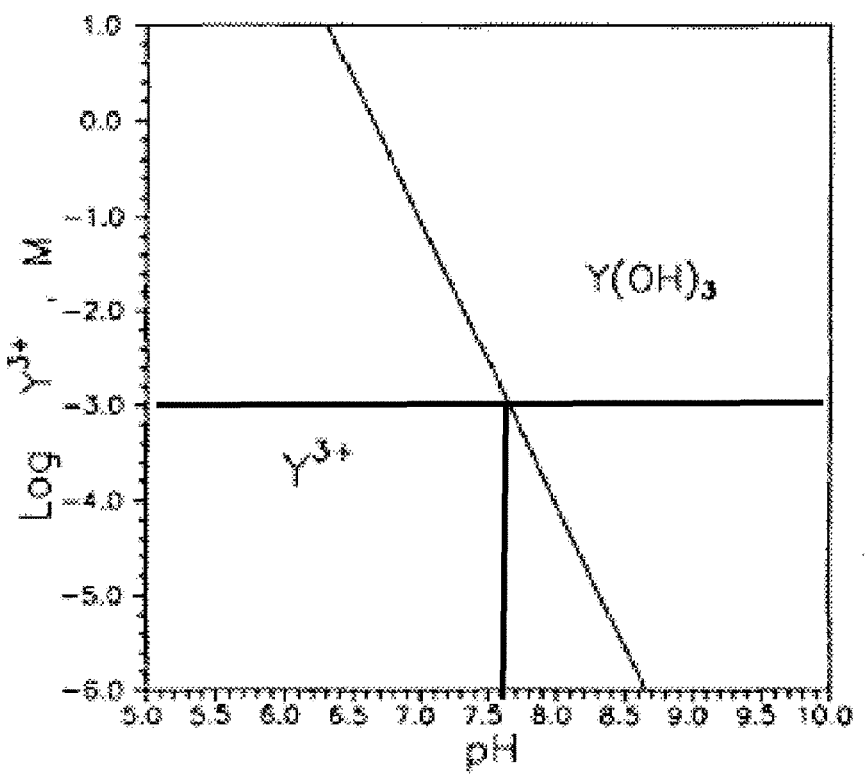
FIGS. 1-8 represent non-limiting, exemplary embodiments as described herein.

The disclosed embodiments will now be described in greater detail with reference to the accompanying drawings.

As used herein, the singular forms "a," "an" and "the" are intended to comprise the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Disclosed is a method for preparing a nanophosphor from a metal hydroxy carbonate.

The method can be a one-step process or a two-step process, based on the addition of an activator.

The one-step process involves adding an activator in combination with other reactants to a solvent. According to this process, a uniformly doped nanophosphor can be prepared because a metal hydroxy carbonate and an activator are added to the liquid phase before co-precipitation. As used herein the liquid phase means a solution state comprising a metal precursor and urea. In one-step process, a solution preparing a metal hydroxyl carbonate comprises not only a metal precursor and urea but an activator, thus doping of the activator simultaneously occurs preparing of a metal hydroxyl carbonate. As a result, an activator are uniformly doped on nanophosphor.

The one-step process comprises dissolving a metal precursor, an activator and urea ($NH_2CONH_2$) in a solvent to prepare a solution; adjusting a pH of the solution to a selected pH such that metal ions derived from the metal precursor are present in the solution in an ionic state, and controlling a reaction temperature to prepare a phosphor precursor; and calcining the phosphor precursor to obtain a nanophosphor.

Unlike the one-step process, the two-step process involves obtaining a metal hydroxy carbonate and then adding an activator thereto. More specifically, the two step process comprises dissolving a metal precursor and urea ($NH_2CONH_2$) in a solvent to prepare a solution; adjusting a pH of the solution to a selected pH such that metal ions derived from the metal precursor are present in the solution in an ionic state, and controlling a reaction temperature to prepare a metal hydroxy carbonate containing solution; adding an activator to the metal hydroxy carbonate-containing solution to prepare a phosphor precursor; and calcining the phosphor precursor to obtain a nanophosphor.

According to the disclosed method, the nanophosphor is obtained by calcining phosphor precursor, wherein the phosphor precursor is derived from the activator-doped metal hydroxy carbonate. While not wanting to be bound by theory, it is believed the metal hydroxy carbonate is produced by a process that forms a nucleus of the metal hydroxy carbonate by hydrolysis of urea.

The phosphor particles thus prepared exhibit superior sphericity, good dispersibility and uniform size distribution. The uniform particle size of the phosphor enables improvement in color purity and luminescence efficiency.

FIG. 1 is a graph showing the state of yttrium hydroxide at 25° C. While not wanting to be bound by theory, a more detailed explanation of the disclosed process, with reference to FIG. 1, is as follows. In the case where $Y(NO_3)_3$ is used as the metal precursor, yttrium can exist in two states depending on the concentration of yttrium trivalent ions ($Y^{3+}$) and pH. When the concentration of $Y^{3+}$ ions is less than about 0.001 M, or about 0.0005 M, or about 0.0001 M, $Y^{3+}$ ions do not form $Y(OH)_3$ precipitate at a pH less than or equal to about 7.6, or less than or equal to about 7.5 or less than or equal to about 7, and the yttrium maintains its ionic state. According to the disclosed method, the concentration and pH at which the metal can maintain its ionic state are controlled. In this regard, when the metal maintaining its ionic state under the controlled conditions is heated and reacted with urea ($NH_2CONH_2$), the urea is cleaved and reacted with $Y^{3+}$ ions to produce $Y(OH)CO_3$. Accordingly, the size and shape of phosphor particles can be readily controlled only by controlling the concentration or pH of the metal precursor.

The solvent that can be used in the disclosed method is not particularly restricted. Exemplary solvents include water, organic solvents, or the like, or a combination comprising at least one of the foregoing solvents. An exemplary solvent is water in view of convenience of handling. Alternatively, the solvent can be an organic solvent or combination of water and an organic solvent. Exemplary organic solvents include an alcohol, e.g., ethanol, or acetone, or the like, or a combination comprising at least one of the foregoing organic solvents.

The metal precursor for a precursor matrix can be used alone or in combination of two or more types, and can include an alkaline earth metal precursor and/or a rare earth metal precursor. Exemplary precursors include a metal nitrate, metal chloride, metal acetate, metal sulfate metal oxide, or the like, or a combination comprising at least one of the foregoing compounds. Other exemplary precursors include $Y(NO_3)_3$, $Y(Cl)_3$, $Y(CH_3COO)_3$, $Y_2(SO_4)_3$, $La(NO_3)_3$, $La(Cl)_3$, $La(CH_3COO)_3$, $La_2(SO_4)_3$, $Eu(NO_3)_3$, $Eu(Cl)_3$, $Eu(CH_3COO)_3$, $Eu_2(SO_4)_3$, $Gd(NO_3)_2$, $Gd(Cl)_2$, $Gd(CH_3COO)_2$, $Gd_2(SO_4)_3$, $Ce(NO_3)_2$, $Ce(Cl)_2$, $Ce(CH_3COO)_2$, $Ce(SO_4)_2$, or the like, or a combination comprising at least one of the foregoing compounds.

The activator that can be used to dope the phosphor matrix in the disclosed method is not particularly restricted. Exemplary activators include europium (Eu), cerium (Ce), terbium (Tb), erbium (Er), manganese (Mn), strontium (Sr), scandium (Sc), or the like, or a combination comprising at least one of the foregoing elements. The phosphor matrix is defined as the structure of materials emitting light when activators are doped.

The activator can be added in the form of a powder or liquid to the solvent. Alternatively, the activator can be added in the form of a powder or liquid to the solution.

The pH of the solution in the adjusting part of the method is selected to be within a range that allows the selected metal to exist in an ionic state. Thus, when trivalent metal ions are used, the pH can be in a range of about 2 to about 9, or about 3 to about 8, or about 4 to about 7.

The heating of the pH-adjusted solution to allow metal hydroxy carbonate nanoparticles to form on the phosphor surface can be carried out at about 80° C., at about 85° C. to about 95° C., or at about 90° C. to about 92° C. The heating can be carried out for about 10 to about 60 minutes or about 20 minutes to about 50 minutes.

In accordance with the one-step process, a nucleus of a metal hydroxy carbonate is formed by hydrolysis of urea and then developed, wherein the metal hydroxy carbonate is doped with the activator. Thus, a phosphor precursor can be prepared through a single process.

The activator-doped metal hydroxy carbonate thus obtained acts as a phosphor precursor. A nanophosphor is prepared by filtering the activator-doped metal hydroxy carbonate from the solution, followed by washing, drying and calcining. The calcining method of the phosphor precursor is not particularly restricted and any method commonly used in the art may be used. Exemplary calcining methods include, for example, calcining in the air; calcining through mixing gases of the hydrogen and the nitrogen; calcining through mixing gases of the hydrogen and the argon; and calcining by using mixed gas of the oxygen and ammonia. The calcining can be carried out at about 500° C. to about 1,400° C., 600° C. to about 1,300° C., or about 700° C. to about 1,200° C. When the calcining temperature is lower than about 500° C., the activator-doped phosphor precursor does not crystallize and the final phosphor thus emits no light. When the calcining temperature exceeds about 1,400° C., the reaction is carried out at an excessively high temperature, thus making it difficult to prepare nanophosphors. The calcining can be carried out for about 30 minutes to about 8 hours, 1 hour to about 7 hours or 2 hours to about 20 hours.

Other exemplary embodiments are directed to a nanophosphor prepared by the disclosed method.

The nanophosphor prepared from metal hydroxy carbonate is obtained by calcining activator-doped metal hydroxy carbonate used as a phosphor precursor. Accordingly, the phosphor prepared by the disclosed method exhibits superior sphericity, good dispersibility and uniform particle size distribution, thus enabling improvement in color purity and luminescence efficiency.

The nanophosphor can be in the form of an activator-doped metal oxide. In an embodiment, the metal of the activator-doped metal oxide includes an alkaline earth metal and/or a rare earth metal. Exemplary metals include magnesium (Mg), calcium (Ca), strontium (Sr), barium (Ba), radium (Ra), scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or the like, or a combination comprising at least one of the foregoing metals.

The activator that can be used to dope the phosphor matrix is not particularly restricted and any activator commonly used in the art can be used. Exemplary activators include europium (Eu), cerium (Ce), terbium (Tb), erbium (Er), manganese (Mn), strontium (Sr) and scandium (Sc), or the like, or a combination comprising at least one of the foregoing elements. The amount of the activator doped into the nanophosphor can be about 0.1 mole percent to about 20 mole percent, about 0.5 to about 15 mole percent, or about 2 to about 10 mole percent.

The shape of the nanophosphor is not particularly restricted. Exemplary shapes include a sphere and a semicircle, or the like, or a combination comprising at least one of the foregoing shapes.

The nanoparticles can have a size of about 10 nanometers (nm) to about 1 micrometers (μm), specifically about 50 nm to about 70 nm, or about 100 nm to about 500 nm.

The use of the nanophosphor is not particularly restricted. Specifically, the phosphor can be widely utilized for application in displays, such as fluorescent lamps, cathode ray tubes (CRTs), light emitting diodes (LEDs), plasma display panels (PDPs), vacuum fluorescent display (VFDs), field emission displays (FEDs), electro luminescence displays (ELDs), or the like. In particular, the nanophosphor can be used for emission of visible light upon ultraviolet or vacuum ultraviolet ray excitation.

Exemplary embodiments are directed to a display device using the disclosed phosphor. Exemplary display devices include, but are not limited to fluorescent lamps, cathode ray tubes (CRTs), light emitting diodes (LEDs), plasma display panels (PDPs), vacuum fluorescent displays (VFDs), field emission displays (FEDs), electro luminescence displays (ELDs), or the like. In one exemplary embodiment, the phosphor can be used in a cold cathode fluorescence lamp (CCFL). Such a CCFL has a structure in which a fluorescent material is disposed on a glass tube, two electrodes are disposed and sealed at opposite ends of the glass tube, respectively, and a selected amount of a mixed gas of mercury, argon and neon is disposed inside the glass tube. A high-voltage electric field is applied to the electrodes at opposite ends to induce discharge of electrons. When the electrons begin to discharge, the mercury is excited and ultraviolet light thus emits. The ultraviolet light collides with phosphor particles present on the wall of the glass tube to emit visible light. Such visible light can be utilized in backlight units of liquid crystal display devices, faxes, scanners, copying machines, flat panel displays, and light sources for decorative or advertising elements.

The phosphor can be used in an external electrode fluorescent lamps (EEFL), a flat fluorescent lamps (FFL), or the like, in addition to a cold cathode fluorescence lamp (CCFL).

Hereinafter, the disclosed embodiments will be explained in more detail with reference to the following examples. However, these examples are given for the purpose of illustration and are not intended to limit the disclosure.

EXAMPLES

Example 1

Figure 3:
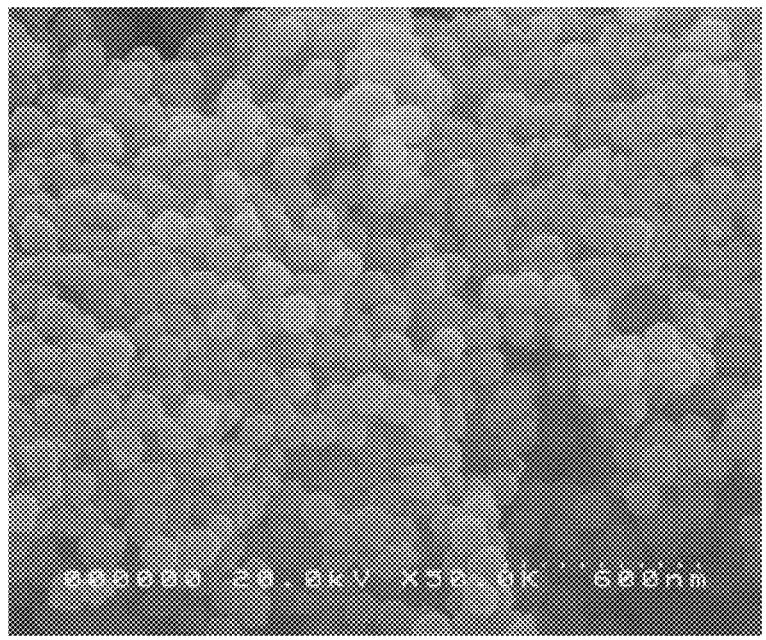
Figure 4:
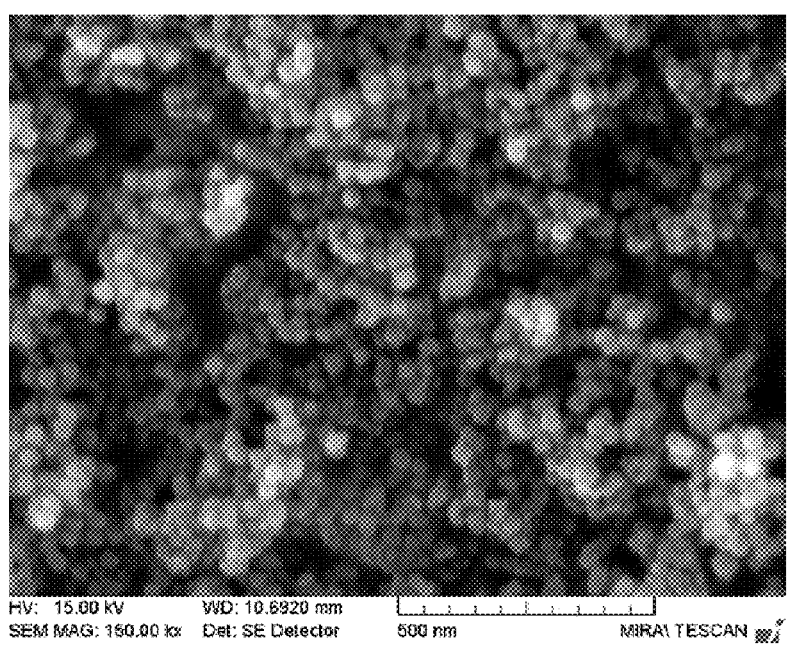
Figure 8:
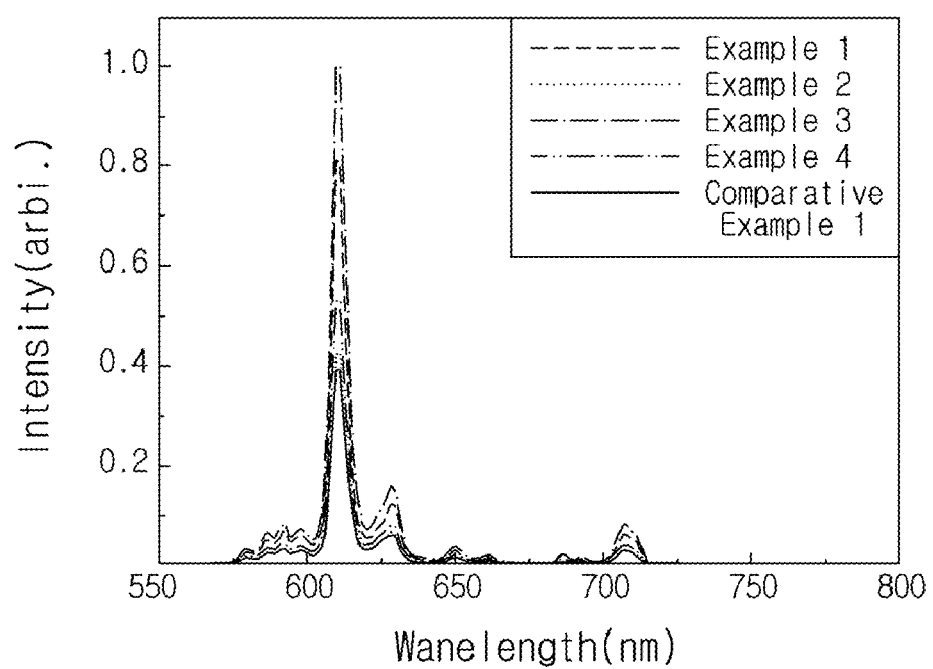

One-Step Process 2.5 g of yttrium nitrate, 0.12 g (4 mol %) of europium nitrate and 6 g of urea were dissolved in 200 mL of distilled water. The solution was thoroughly stirred for 30 min and adjusted to pH 5.5 with nitric acid. The resulting solution was heated at 90° C. with stirring for 30 min to obtain $Y(OH)CO_3$:Eu as a phosphor precursor. The scanning electron micrograph (SEM) of the phosphor precursor is shown in FIG. 3. Subsequently, the phosphor precursor was filtered and washed with distilled water three times. The resulting precipitate was dried in an oven at 60° C. for 3 hours. The dried phosphor was calcined under an air atmosphere in a furnace at 800° C. for 2 hours to obtain the nanophosphor $Y_2O_3$:Eu. The scanning electron micrograph (SEM) and photoluminescence spectra (under excitation at 254 nm) of the nanophosphor thus obtained are shown in FIG. 4 and FIG. 8, respectively.

Example 2

Figure 2:
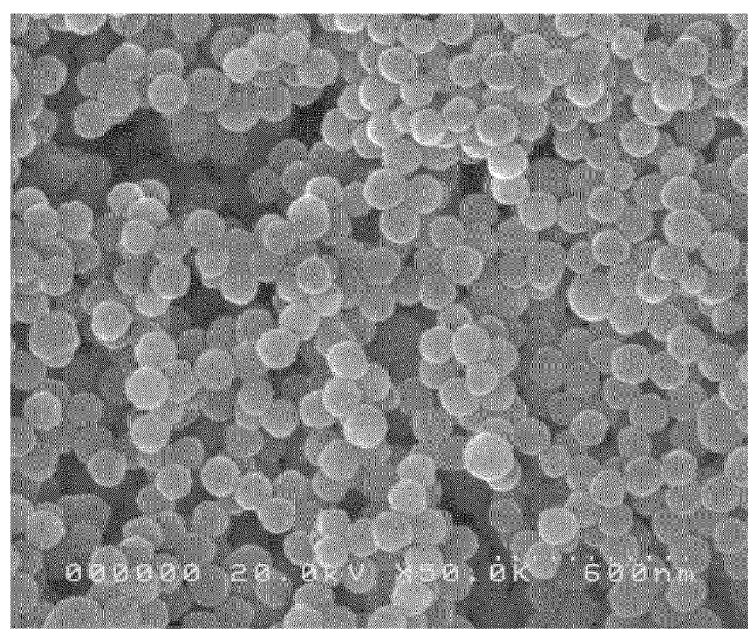
Figure 5:
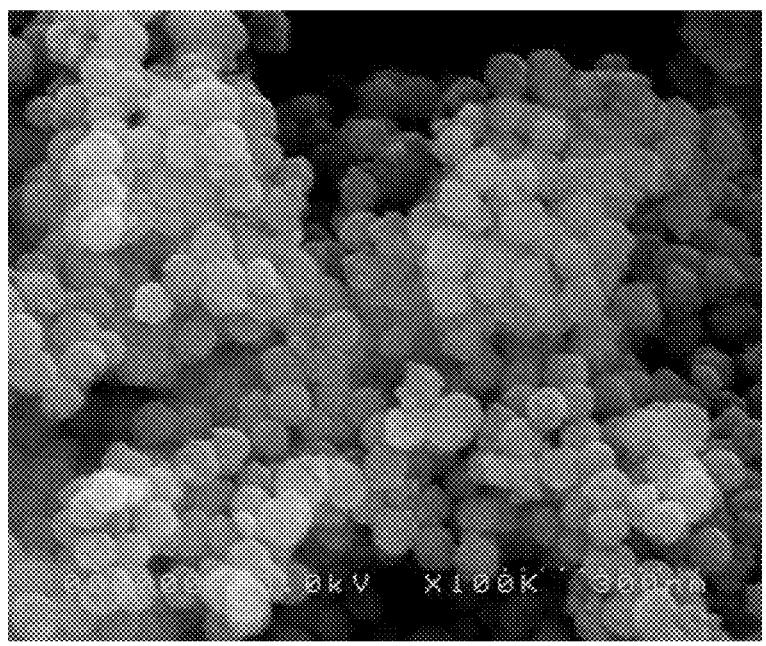

Two-Step Process 2.5 g of yttrium nitrate and 6 g of urea were dissolved in 190 mL of distilled water. The solution was thoroughly stirred for 30 min and adjusted to pH 5.5 with nitric acid. The resulting solution was heated at 90° C. while slowly stirring for 30 min to obtain $Y(OH)CO_3$ as a precipitate. The scanning electron micrograph (SEM) of the precipitate is shown in FIG. 2. Subsequently, the precipitate was filtered, a 10 mL solution of 0.12 g (4 mol %) of europium nitrate in distilled water was slowly added thereto, and the mixture was slowly stirred for 30 min. The resulting phosphor precursor solution was dried in an oven at 100° C. for 3 hours to evaporate the solvent. The dried phosphor was calcined under an air atmosphere in a furnace at 800° C. for 2 hours to obtain the nanophosphor $Y_2O_3$:Eu. The scanning electron micrograph (SEM) and photoluminescence spectra (under excitation at 254 nm) of the nanophosphor thus obtained are shown in FIG. 5 and FIG. 8, respectively.

Example 3

Figure 6:
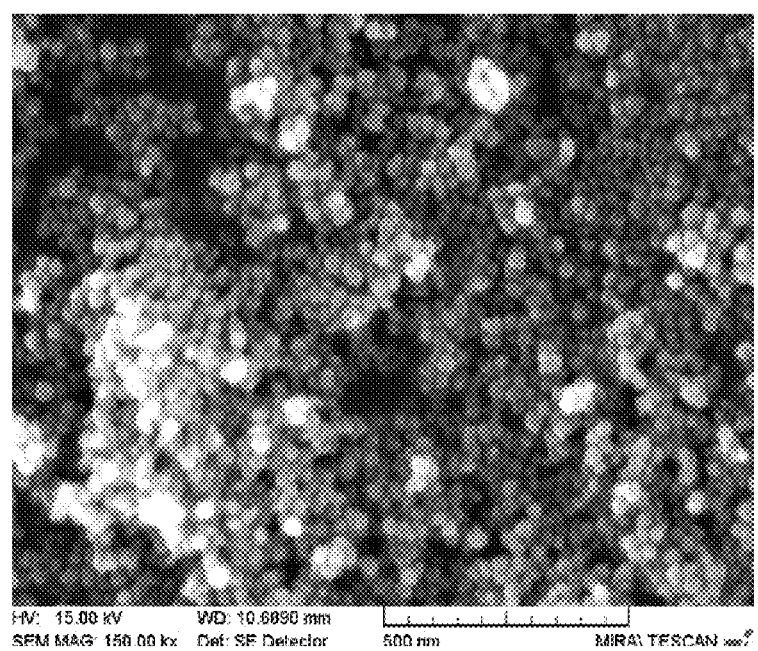

One-Step Process 2.5 g of yttrium nitrate, 0.18 g (6 mol %) of europium nitrate and 6 g of urea were dissolved in 200 mL of distilled water. The solution was thoroughly stirred for 30 min and adjusted to pH 5.5 with nitric acid. The resulting solution was heated at 90° C. with stirring for 30 min to obtain $Y(OH)CO_3$:Eu as a phosphor precursor. Subsequently, the phosphor precursor was filtered and washed with distilled water three times. The resulting precipitate was dried in an oven at 60° C. for 3 hours. The dried phosphor was calcined under an air atmosphere in a furnace at 800° C. for 2 hours to obtain the phosphor $Y_2O_3$:Eu. The scanning electron micrograph (SEM) and photoluminescence spectra (under excitation at 254 nm) of the nanophosphor thus obtained are shown in FIG. 6 and FIG. 8, respectively.

Example 4

Figure 7:
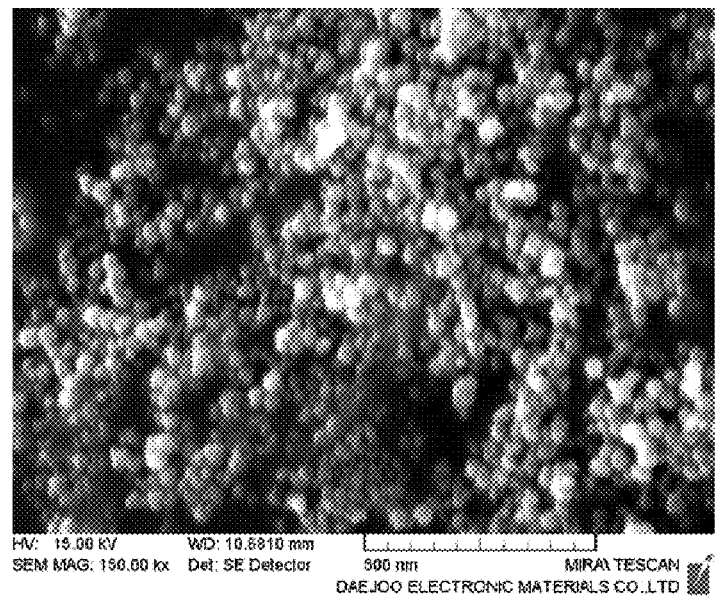

One-Step Process 2.5 g of yttrium nitrate, 0.24 g (8 mol %) of europium nitrate and 6 g of urea were dissolved in 200 mL of distilled water. The solution was thoroughly stirred for 30 min and adjusted to pH 5.5 with nitric acid. The resulting solution was heated at 90° C. with stirring for 30 min to obtain Y(OH)CO$_3$:Eu as a phosphor precursor. Subsequently, the phosphor precursor was filtered and washed with distilled water three times. The resulting precipitate was dried in an oven at 60° C. for 3 hours. The dried phosphor was calcined under an air atmosphere in a furnace at 800° C. for 2 hours to obtain the phosphor Y$_2$O$_3$:Eu. The scanning electron micrograph (SEM) and photoluminescence spectra (under excitation at 254 nm) of the nanophosphor thus obtained are shown in FIG. 7 and FIG. 8, respectively.

Comparative Example 1

2.5 g of yttrium nitrate and 0.18 g (6 mol %) of europium nitrate were dissolved in 200 mL of distilled water. The solution was thoroughly stirred for 30 min and adjusted to pH 12 with nitric acid. The resulting solution was stirred for 30 min to obtain a phosphor precursor. Subsequently, the phosphor precursor was filtered and washed with distilled water three times. The resulting precipitate was dried in an oven at 60° C. for 3 hours. The dried phosphor was calcined under air atmosphere in a furnace at 800° C. for 2 hours to obtain the phosphor Y$_2$O$_3$:Eu.

Experimental Example 1

Luminescence Efficiency

The photoluminescence (PL) spectra under excitation at 254 nm of the phosphors prepared in Examples 1 to 4 and Comparative Example 1 were measured. The results are shown in Table 1 below:

TABLE 1

| Example or Comparative Example No. | Luminescence efficiency (%) |
|---|---|
| Comp. Ex. 1 | 40 |
| Ex. 1 | 80 |
| Ex. 2 | 42 |
| Ex. 3 | 100 |
| Ex. 4 | 53 |

The data in the Examples and Comparative Examples show that the disclosed nanophosphor unexpectedly exhibits uniform particle size distribution, good color purity and excellent luminescence efficiency.

One of ordinary skill in the art will understand from the foregoing that the disclosed method for preparing nanophosphors from a metal hydroxy carbonate is capable of mass-producing a nanophosphor through a simple process. The process thus reduces preparation costs. The nanophosphor prepared by the method exhibits superior dispersibility, uniform particle size distribution, good color purity and high luminescence efficiency.

The disclosed embodiments have been described in detail with reference to the foregoing exemplary embodiments. However, the disclosure is not intended to be limited to the disclosed embodiments. Those skilled in the art will appreciate that various modifications and variations are possible, without departing from the scope and spirit of the appended claims. Accordingly, such modifications and variations are intended to come within the scope of the claims.

What is claimed is:

1. A method for preparing a nanophosphor using an activator-doped metal hydroxy carbonate as a phosphor precursor, the method comprising:
   dissolving a metal precursor, an activator and urea (NH$_2$CONH$_2$) in a solvent to prepare a solution comprising a metal;
   adjusting pH of the solution to between about 3 to about 9, such that the metal in the solution exists in an ionic state;
   controlling a reaction temperature to prepare the phosphor precursor; and
   calcining the phosphor precursor to obtain a nanophosphor.

2. The method according to claim 1, wherein the reaction temperature is controlled to be equal to or greater than 80° C. for a time between about 10 to about 60 minutes.

3. The method according to claim 1, wherein the calcining is carried out at a temperature between about 500° C. to about 1,400° C. for a time between about 30 minutes to about 8 hours.

4. The method according to claim 1, wherein the solvent comprises water, an organic solvent, or a combination comprising at least one of the foregoing solvents.

5. The method according to claim 4, wherein the metal precursor comprises Y(NO$_3$)$_3$, Y(Cl)$_3$, Y(CH$_3$COO)$_3$, Y$_2$(SO$_4$)$_3$, La(NO$_3$)$_3$, La(Cl)$_3$, La(CH$_3$COO)$_3$, La$_2$(SO$_4$)$_3$, Eu(NO$_3$)$_3$, Eu(Cl)$_3$, Eu(CH$_3$COO)$_3$, Eu$_2$(SO$_4$)$_3$, Gd(NO$_3$)$_2$, Gd(Cl)$_2$, Gd(CH$_3$COO)$_2$, Gd$_2$(SO$_4$)$_3$, Ce(NO$_3$)$_2$, Ce(Cl)$_2$, Ce(CH$_3$COO)$_2$, Ce(SO$_4$)$_2$, or a combination comprising at least one of the foregoing compounds.

6. The method according to claim 5, wherein the activator comprises europium (Eu), cerium (Ce), terbium (Tb), erbium (Er), manganese (Mn), strontium (Sr), scandium (Sc), or a combination comprising at least one of the foregoing elements.

7. The method according to claim 1, wherein the metal precursor comprises a metal nitrate, metal chloride, metal acetate, metal sulfate, metal oxide, or a combination comprising at least one of the foregoing compounds.

8. The method according to claim 1, wherein the activator is in the form of a powder or a liquid.

9. A method for preparing a nanophosphor using an activator-doped metal hydroxy carbonate as a phosphor precursor, comprising:
   dissolving a metal precursor and urea (NH$_2$CONH$_2$) in a solvent to prepare a solution;
   adjusting a pH of the solution such that the metal in the solution exists in an ionic state;
   controlling a reaction temperature to prepare a metal hydroxy carbonate-containing solution;
   adding an activator to the metal hydroxy carbonate-containing solution to prepare a phosphor precursor; and
   calcining the phosphor precursor to obtain a nanophosphor.

10. The method according to claim 9, wherein the reaction temperature is controlled to be equal to or greater than about 80° C. for a time between about 10 to about 60 minutes.

11. The method according to claim 9, wherein the calcining is carried out at a temperature between about 500° C. to about 1,400° C. for about 30 minutes to about 8 hours.

* * * * *